United States Patent [19]

Matumoto et al.

[11] Patent Number: 5,560,422
[45] Date of Patent: Oct. 1, 1996

[54] CONTROLLER FOR AIR CONDITIONER

[75] Inventors: Satoshi Matumoto, Gunma-ken; Hikaru Katuki, Kiryu; Masayuki Simizu, Gunma-ken, all of Japan

[73] Assignee: Sanyo Electric Co., Ltd., Moriguchi, Japan

[21] Appl. No.: 424,691

[22] Filed: Apr. 18, 1995

[30] Foreign Application Priority Data

Apr. 19, 1994 [JP] Japan .................... 6-080765

[51] Int. Cl.$^6$ .................................... F25B 29/00
[52] U.S. Cl. ............... 165/259; 165/253; 62/158; 62/160; 236/46 R
[58] Field of Search .................. 165/26, 12; 62/160, 62/159, 158, 157, 231; 236/46 R, 46 F

[56] References Cited

U.S. PATENT DOCUMENTS

| | | | |
|---|---|---|---|
| 4,265,299 | 5/1981 | Harnish | 165/12 |
| 4,460,123 | 7/1984 | Beverly | 62/231 |
| 4,661,914 | 4/1987 | Molokey et al. | 236/46 R |
| 4,674,027 | 6/1987 | Beckey | 236/46 R |
| 4,734,871 | 3/1988 | Tsunoda et al. | 165/12 |
| 4,841,738 | 6/1989 | Katsuki et al. | |
| 4,903,498 | 2/1990 | Hanson | 62/160 |
| 5,323,619 | 6/1994 | Kim | 62/160 |
| 5,395,042 | 3/1995 | Riley et al. | 165/12 |

FOREIGN PATENT DOCUMENTS

63-217159 9/1988 Japan.

Primary Examiner—F. Daniel Lopez
Assistant Examiner—Mark Sgantzos
Attorney, Agent, or Firm—Knobbe, Martens Olson & Bear

[57] ABSTRACT

A controller for an air conditioner is provided wherein an operation mode is not unnecessarily changed in accordance with variations in temperature. When room temperature t is in a range of T+3.0>t≧T+1.5, and when a timer expires (steps 212, 214), it is determined whether the room temperature has a tendency to fall (step 218). When the room temperature has a tendency to fall, it is predicted that the room temperature will be in an observing region although the operation mode is not changed. For this reason, the current operation mode is kept. On the other hand, when the room temperature does not have a tendency to fall, a cooling mode is set (step 210). Further, when the room temperature t is in a range of T-3.0<t≦T-1.5, and when the timer expires (steps 222, 224), it is determined whether the room temperature has a tendency to rise (step 228). When the room temperature has a tendency to rise, it is predicted that the room temperature will be in the observing region although the operation mode is not changed. For this reason, the current operation mode is kept. On the other hand, when the room temperature does not have a tendency to rise, a heating mode is set (step 230).

34 Claims, 7 Drawing Sheets

CONTROLLER FOR AIR CONDITIONER

BACKGROUND OF THE INVENTION

1. Field of the Invention

The present invention relates to a controller for an air conditioner, and more particularly to a controller for an air conditioner, which has a cooling mode for effecting a cooling operation and a heating mode for effecting a heating operation and which automatically changes an operation mode of an air conditioner so that room temperature becomes a predetermined set value.

2. Description of the Related Art

As a prior art on which the present invention is based, there exists Japanese Patent Application Laid-Open No. 63-217159. This technique disclosed therein compares the temperature of a room to be air-conditioned (i.e., room temperature) and a predetermined set temperature with each other and effects on-off control of an air conditioner so that the room temperature becomes the predetermined set temperature. Further, a temperature region including the set temperature in the center thereof is previously determined as an observing region. When an operation mode is a heating mode and the period of time in which the room temperature resides in a first region which exceeds an upper limit of the observing region is greater than or equal to a predetermined value, the operation mode is changed from a heating mode to a cooling mode. When the operation mode is the cooling mode and the period of time in which the room temperature resides in a second region which is less than a lower limit of the observing region is greater than or equal to the predetermined value, the operation mode is changed from the cooling mode to the heating mode. With this technique, when load within the room to be air-conditioned temporarily varies, for example, when a door opens and closes, or when the number of indoor users increases or decreases, the operation mode is adapted to not change within the predetermined observing region so as to not unnecessarily change in accordance with variations in the temperature within the room.

However, in the above-described prior art, the operation mode is to be changed without considering a tendency of temperature variation when the period of time in which the room temperature resides within the first region is longer than or equal to the predetermined value. Accordingly, even if, during operation in the heating mode, the room temperature near the upper limit of the observing region has a tendency to fall, the operation mode is changed to the cooling mode. For this reason, even when it is predicted that the room temperature will become a value within the observing region without changing the operation mode, the operation mode is changed and a compressor is actuated, so that the room temperature is forcibly controlled to be the set value. Accordingly, there was a drawback in that the air-conditioning cannot be controlled so that the users feel comfortable.

Further, when the period of time in which the room temperature resides within the second region is longer than or equal to the predetermined time, i.e., even when, during operation in the cooling mode, the room temperature near the lower limit of the observing region has a tendency to rise and it is predicted that the room temperature will become a value within the observing region, the operation mode is changed to the heating mode. Accordingly, there also existed the drawback as described above.

SUMMARY OF THE INVENTION

The present invention has been achieved in order to solve the above-described drawback and an object of the present invention is to provide a controller for an air conditioner, which makes it possible to control the air-conditioning so that the users feel comfortable, by not changing an operation mode in a state in which it is predicted that room temperature will become a value within an observing region.

In order to achieve the above-described object, in accordance with a first aspect of the present invention, there is provided a controller for an air conditioner having a detecting means for detecting temperature of a room to be airconditioned, the room being heated or cooled so that the temperature becomes a desired temperature, comprising: predicting means for predicting a temperature tendency of the room; time measuring means for measuring a first period of time and a second period of time; control means for controlling a heating mode for heating the room and a cooling mode for cooling the room such that the temperature becomes the desired temperature; first changing means which, in a case where, in the heating mode, the room temperature is within a first region which exceeds an upper limit of an observing region including the desired temperature when the first period of time has elapsed, changes said heating mode to the cooling mode if the temperature tendency is rising; and second changing means which, in a case where, in the cooling mode, the room temperature is within a second region which is less than a lower limit of the observing region including the desired temperature when the second period of time has elapsed, changes the cooling mode to the heating mode if the temperature tendency is falling.

Further, in accordance with a second aspect of the present invention, there is provided a controller for an air conditioner having a detecting means for detecting temperature of a room to be airconditioned, the room being heated or cooled so that the temperature becomes a desired temperature, comprising: predicting means for predicting a temperature tendency of the room; time measuring means for measuring, as a first period of time, an elapsed time after heating of the room is stopped, and measuring, as a second period of time, an elapsed time after cooling of the room is stopped; control means for controlling a heating mode for heating the room and a cooling mode for cooling the room such that the temperature becomes the desired temperature; first changing means which, in a case where, in the heating mode, the room temperature is within a first region which exceeds an upper limit of an observing region including the desired temperature when the first period of time has elapsed, changes the heating mode to the cooling mode if the temperature tendency is rising; and second changing means which, in a case where, in the cooling mode, the room temperature is within a second region which is less than a lower limit of the observing region including the desired temperature when the second period of time has elapsed, changes the cooling mode to the heating mode if the temperature tendency is falling.

In accordance with a third aspect of the present invention, there is provided a controller for an air conditioner having a detecting means for detecting temperature of a room to be airconditioned, the room being heated or cooled so that said temperature becomes a desired temperature, comprising: predicting means for predicting a temperature tendency of the room; time measuring means for measuring, as a first period of time, an elapsed time after heating of the room is stopped and the room temperature became a value within a first region which exceeds an upper limit of an observing region including the desired temperature, and measuring, as a second period of time, an elapsed time after cooling of the room is stopped and the room temperature became a value within a second region which is less than a lower limit of the observing region; control means for controlling a heating mode for heating the room and a cooling mode for cooling the room such that the temperature becomes the desired temperature; first changing means which, in a case where, in the heating mode, the room temperature is within the first region which exceeds the upper limit of the observing region including the desired temperature when the first period of time has elapsed, changes said heating mode to said cooling mode if said temperature tendency is rising; and second changing means which, in a case where, in the cooling mode, the room temperature is within the second region which is less than the lower limit of the observing region including the desired temperature when the second period of time has elapsed, changes the cooling mode to the heating mode if the temperature tendency is falling.

According to the first aspect of the present invention, the detecting means detects room temperature, the predicting means predicts the temperature tendency of the room, and the time measuring means measures the first period of time and the second period of time. The temperature tendency of the room can be predicted from the rate of change in the room temperature, the rate of change of the room-temperature average value, the average value of the rate of change in the room temperature, or the like. Namely, if these values are negative numbers and are less than or equal to a predetermined value, it can be determined that the room temperature has a tendency to fall. If these values are positive numbers and are greater than or equal to a predetermined value, it can be determined that the room temperature has a tendency to rise. Further, it may be possible to use, as the temperature tendency of the room, the predicted value which is obtained by predicting the room temperature after a predetermined period of time from the point in the present time, on the basis of the present-time room temperature and the rate of change in the past-time room temperature.

The control means controls the cooling or heating operation of the air conditioner and the stop of the operation thereof, or the operating ability of the air conditioner, in accordance with the operation mode such that the room temperature becomes a predetermined set or desired temperature. In the case where, in the heating mode, the room temperature is within the first region which exceeds the upper limit of the observing region including the desired temperature after the first period of time has elapsed, the first changing means maintains the heating mode if the room temperature has a tendency to fall, and changes the heating mode to the cooling mode if the room temperature does not have a tendency to fall. Thus, the heating mode is maintained when the room temperature has a tendency to fall. This means that the operation mode is not changed in a state where it is predicted that the room temperature will become a value within the observing region although the operation mode is not changed. Thus, unnecessary changing of the operation mode is prevented.

Further, in the case where, in the cooling mode, the room temperature is within the second region which is less than the lower limit of the observing region after the second period of time has elapsed, the second changing means maintains the cooling mode if the room temperature has a tendency to rise, and changes the cooling mode to the heating mode if the room temperature does not have a tendency to rose. Since the operation mode is maintained even when the room temperature has a tendency to rise, unnecessary changing of the operation mode is prevented.

It suffices that the observing region is defined in such a manner as to include the predetermined set or desired temperature. However, it is preferable that the observing region is defined so as to include the predetermined set temperature in the center thereof, since the upper and lower limits of the observing region are symmetrical to each other with respect to the set temperature, and temperature ranges between the upper limit of the observing region and the set temperature and between the lower limit of the observing region and the set temperature are equal.

Further, as in the second aspect of the present invention, by using the time measuring means, the elapsed time after the heating operation is stopped may, be measured as the first period of time, and the elapsed time after the cooling operation is stopped may be measured as the second period of time. Moreover, as in the third aspect of the present invention, by using the time measuring means, the elapsed time after the heating operation is stopped and the room temperature has become a value within the first region may be measured as the first period of time, and the elapsed time after the cooling operation is stopped and the room temperature has become a value within the second region may be measured as the second period of time. It should be noted that the first period of time and the second period of time may be or may not be equal.

The above and other objects, features and advantages of the present invention Will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 3 includes FIGS. 3A and 3B, and is a flow chart illustrating a control routine of the controller shown in FIG. 1;

DESCRIPTION OF THE PREFERRED EMBODIMENTS

Figure 2:
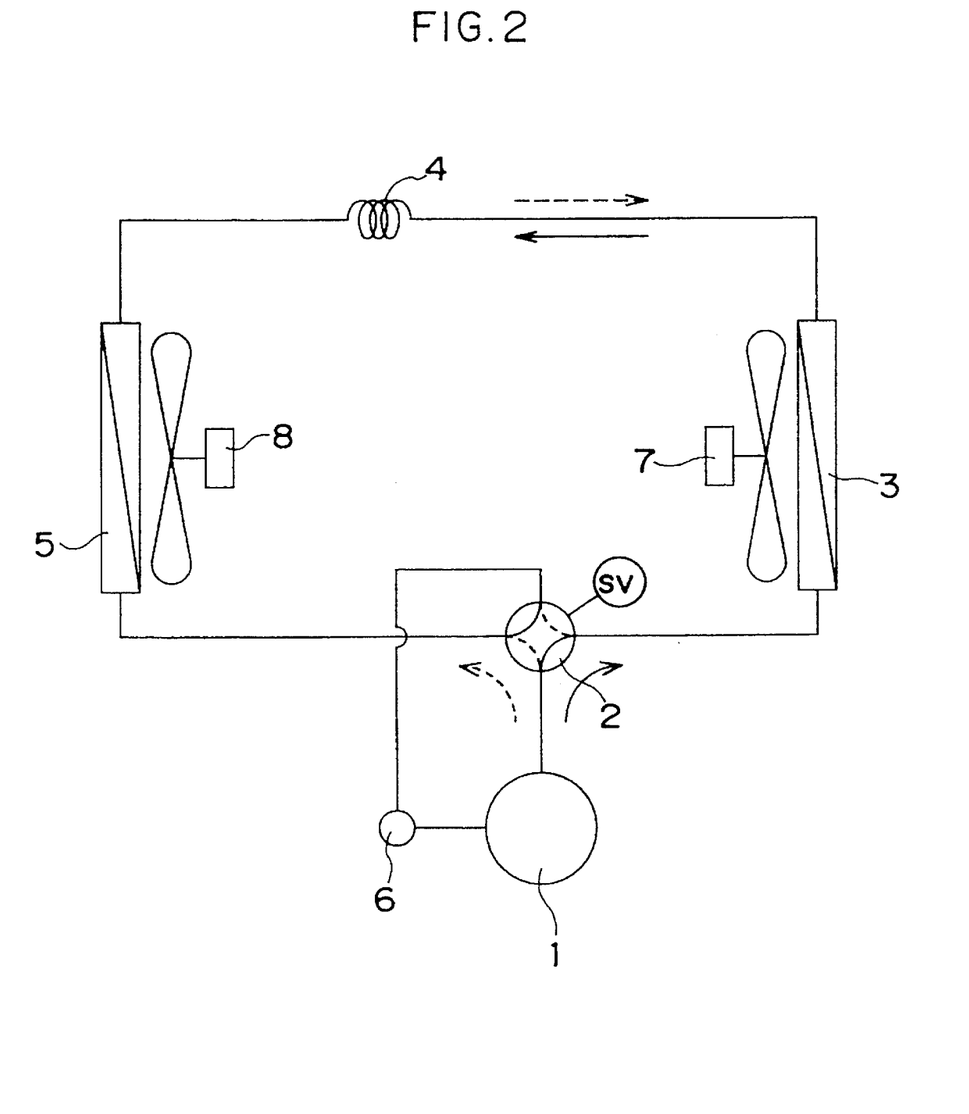
FIG. 2 is a refrigerant circuit diagram of an air conditioner in which the controller shown in FIG. 1 is used.

Referring now to the accompanying drawings, a description will be given of an embodiment of the present invention. FIG. 2 is a refrigerant circuit of an air conditioner controlled by a controller according to the embodiment of the present invention. In FIG. 2, numeral 1 is a compressor, numeral 2 is a four-way valve, numeral 3 is an outdoor-side heat exchanger, numeral 4 is a capillary tube, numeral 5 is an indoor-side heat exchanger, and numeral 6 is an accumulator. These components are sequentially connected in circular by a refrigerant piping arrangement to form a refrigerating cycle. According to the air conditioner, when the four-way valve 2 is in a state indicated by a solid line in FIG. 2, a refrigerant discharged from the compressor 1 flows as indicated by a solid-line arrow and the refrigerant is condensed at the outdoor-side heat exchanger 3. The condensed refrigerant evaporates at the indoor-side heat exchanger 5, to effect air-cooling of the interior of a room. Further, when the four-way valve 2 is in a state indicated by a broken line in FIG. 2, the refrigerant discharged from the compressor 1 flows as indicated by a broken-line arrow and the refrigerant is condensed at the indoor-side heat exchanger 5. The condensed refrigerant evaporates at the outdoor-side heat exchanger 3 and thus, air-heating of the interior of a room is effected.

Numerals 7 and 8 are an outdoor-side air blower and an indoor-side air blower, respectively, which are used to send air to the outdoor-side heat exchanger 3 and the indoor-side heat exchanger 5.

Figure 1:
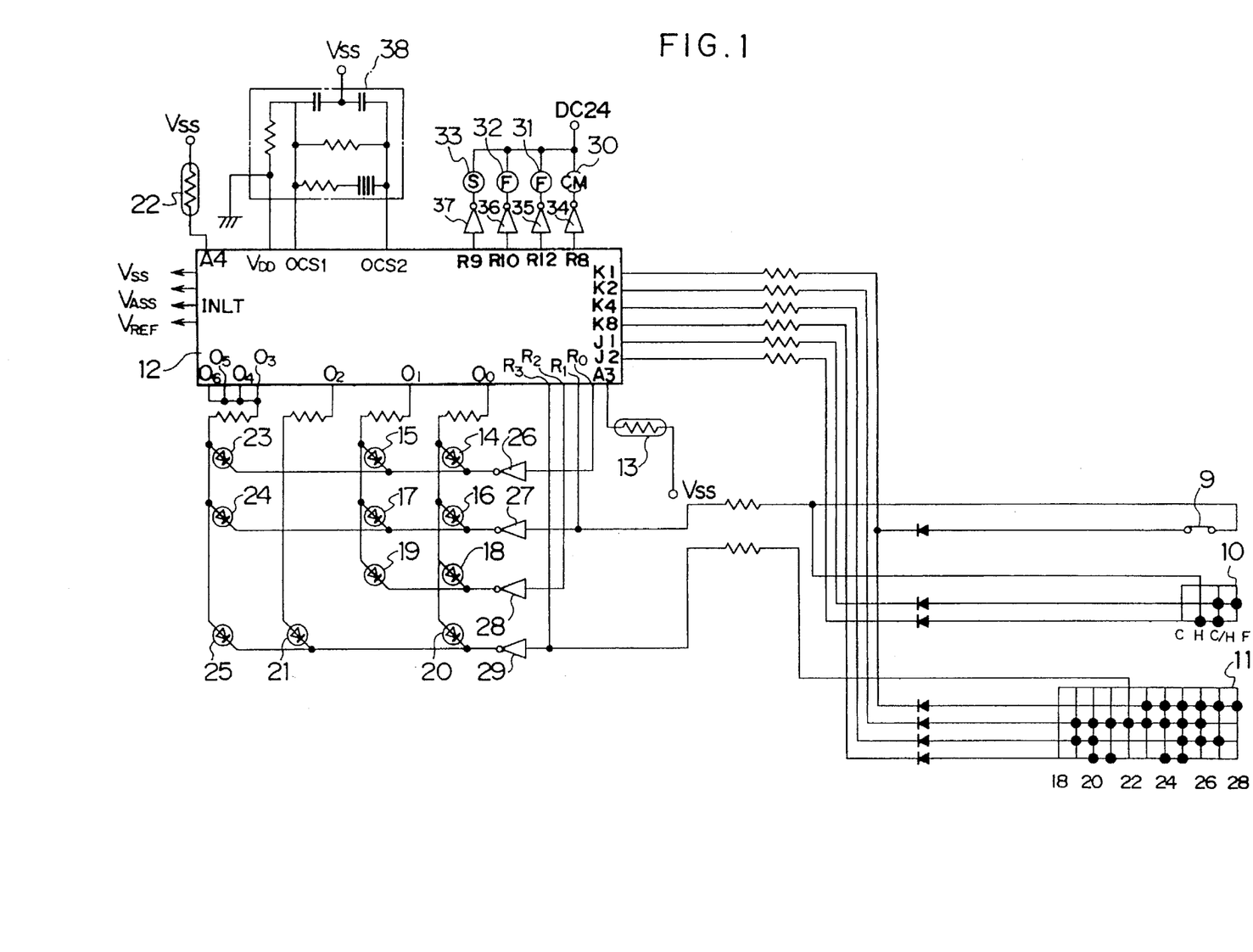
FIG. 1 is a block diagram of a controller according to an embodiment of the present invention.

FIG. 1 shows a main portion of a controller which controls the air conditioner shown in FIG. 2. In FIG. 1, numeral 9 is a push switch, which outputs a signal for changing the operation of the air conditioner between start and stop each time the switch is pushed. Numeral 10 is a changing switch which is used to change an operation mode of the air conditioner, such as a cooling mode C, a heating mode H, a cooling/heating automatically-changing mode C/H and a blowing mode F. A Gray-code switch is used as the changing switch 10. Numeral 11 is a room-temperature setting device which is used to set a predetermined set temperature. The room-temperature setting device 11 is formed of Gray-code switches, whose codes correspond to the set temperatures from 18° C. to 28° C., respectively.

Numeral 12 is a micro processor (microcomputer), for which, for example, TMS2600 manufactured by TI Company, can be used. The microcomputer 12 stores a program on the basis of a control routine described below. The respective states in which the switch 9, the changing switch 10 and the room-temperature setting device 11 are pushed and set, are inputted to the microcomputer 12 by scanning signals at input ports $K_1$, $K_2$, $K_4$, $K_8$, $J_1$, $J_2$ provided from output ports $R_1$, $R_3$ of the microcomputer 12 through the devices 9, 10 and 11, and are stored in corresponding specific addresses.

Numeral 13 is a temperature sensor having an element of which internal resistance value changes in accordance with an ambient temperature. The temperature sensor 13 is provided at a position where it can sense the temperature of a room to be air-conditioned. One end of the temperature sensor 13 is connected to an input port $A_3$ (analog input terminal) of the microcomputer 12 and the other end thereof is connected to a constant-voltage power source $V_{SS}$. The microcomputer 12 inputs electric current corresponding to the temperature of the room to be air-conditioned, from the input port $A_3$ every cycle of the program. Subsequently, the microcomputer 12 effects A/D (analog/digital) conversion for data based on the current value, and stores the converted data. The microcomputer 12 inputs this data value a plurality of times (approximately twenty times) and stores an average value of the inputted data values as the temperature t of the room to be air-conditioned. Thereafter, a temperature controlling operation is effected on the basis of this stored value.

Numerals 14 through 20 are light-emitting elements for representing the room temperature, which are respectively provided at positions corresponding to graduations of 15° C., 17° C., 19° C., 21° C., 23° C., 25° C. and 27° C. The light-emitting element corresponding to the graduation of a value nearest the room temperature t of the room to be air-conditioned is turned on.

Numeral 21 is a light-emitting element for representing "prevention of cold air", which is turned on when the temperature (coil temperature $t_s$) of the indoor-side heat exchanger 5 shown in FIG. 2 is lower than or equal to a predetermined value during a heating operation. The coil temperature $t_s$ is inputted from the temperature sensor 22 to the microcomputer 12 via an input port A4 in the same method as the method of inputting the temperature of the room to be air-conditioned.

Numerals 23, 24 and 25 are light-emitting elements for representing "cooling/heating automatically-changing mode", "cooling mode" and "heating mode", respectively. These light-emitting elements 23, 24 and 25 are provided near the respective represented characters. Further, these light-emitting elements 23, 24 and 25 are respectively turned on in accordance with the operation mode set by the changing switch 10. It should be noted that, when the changing switch 10 is set at "bigwing mode", the light-emitting element 24 for representing "cooling mode" is turned on.

The above-described light-emitting elements 14 through 21, and 23 through 25 are connected to the output ports $R_0$ through $R_3$ and representing ports $O_0$ through $O_6$ of the microcomputer 12 and turned on by a dynamic lighting method. It should be noted that numerals 26 through 29 are inverter circuits.

Numerals 30 through 33 are relays, which control energization for the compressor 1, the indoor-side air blower 8, the outdoor-side air blower 7, and the four-way valve 2, which are all shown in FIG. 2. One ends of these relays 30 through 33 are respectively connected to output ports $R_8$, $R_{12}$, $R_{10}$ and $R_9$ of the microcomputer 12 via inverter circuits 34 through 37, and other ends thereof are connected to a constant-voltage circuit of DC24[V].

Numeral 38 is an oscillating circuit, which is formed from a crystal oscillator, resistance and capacitor and provides a reference clock of the microcomputer 12 to input ports OCS1, OCS2.

Meanwhile, as ordinary power circuits can be used for constant-voltage circuits which output the constant voltage $V_{SS}$, DC24, $V_{ASS}$ and $V_{REF}$, a description thereof is omitted. Further, the above-described $V_{ASS}$, $V_{REF}$ are respectively an upper-limit voltage and a lower-limit voltage in an A/D-converting operation of the microcomputer 12. Moreover, a terminal INLT is a power reset terminal, which inputs a signal which effects a reset operation of the microcomputer 12 at the time of a power source being turned on. It suffices that this signal is outputted when output of the power circuit is greater than or equal to a fixed voltage value at the time of the power source being turned on.

Figure 3A:
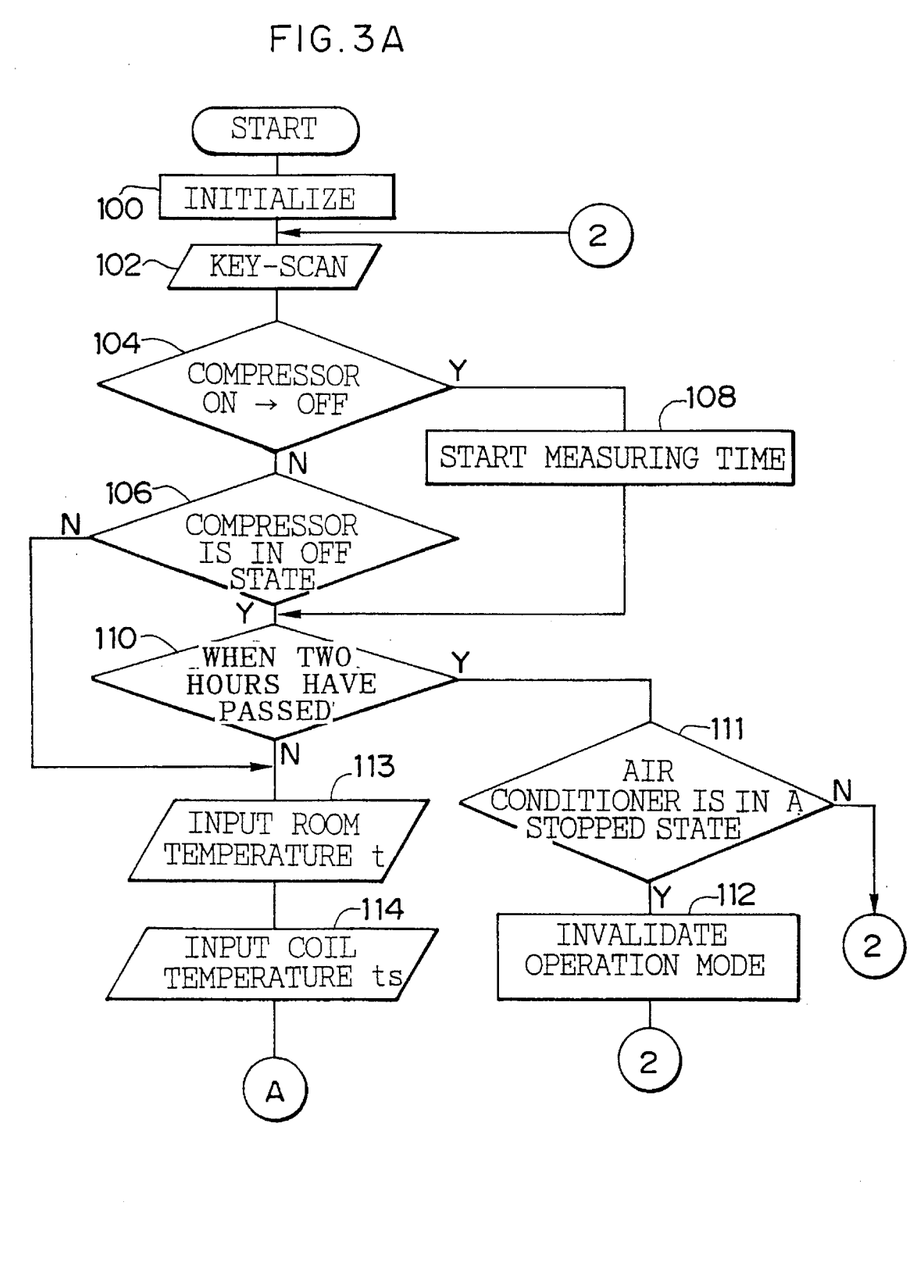
Figure 3B:
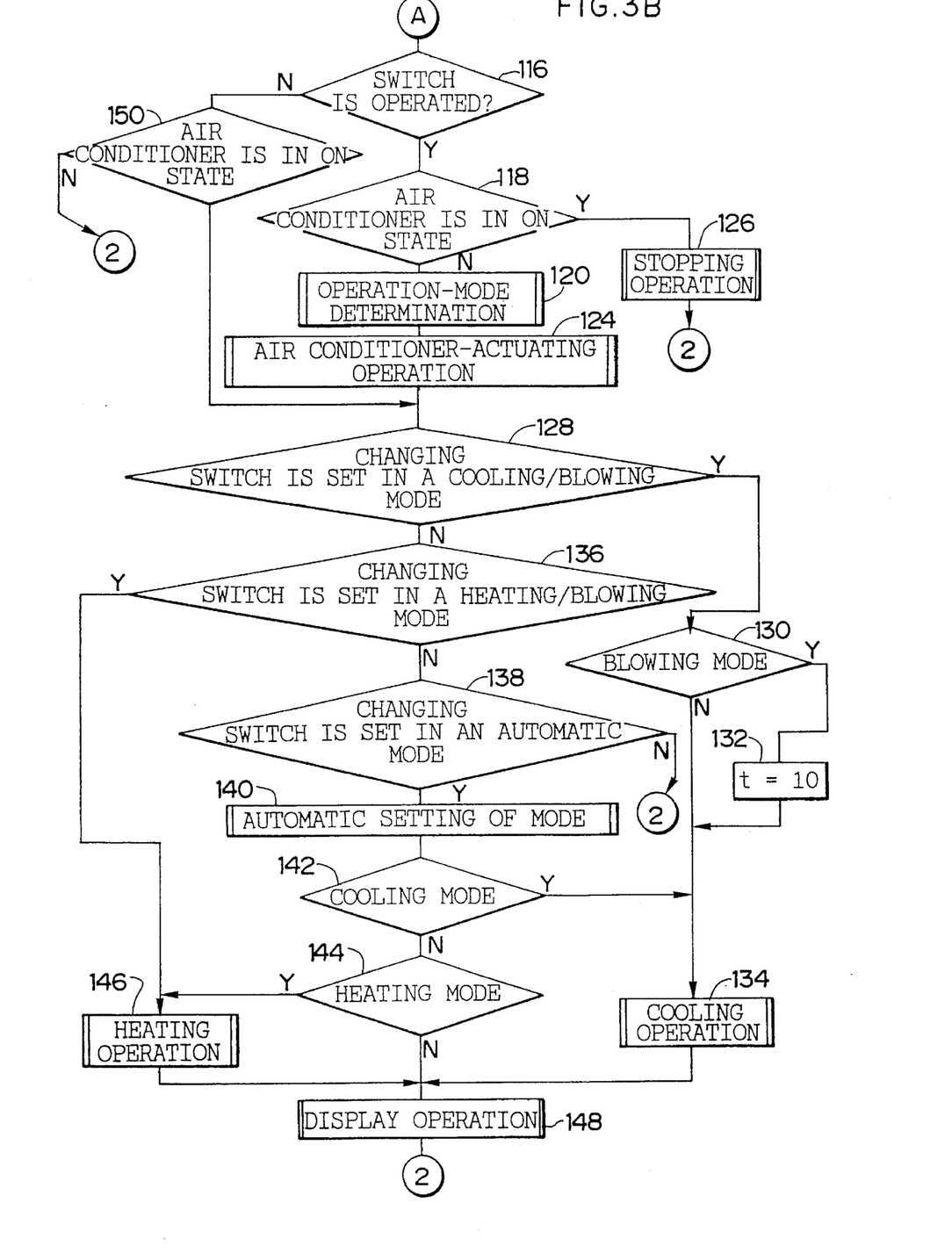

Next, a control routine to be effected by the above-described microcomputer 12 will be described with reference to a flow chart shown in FIG. 3. After contents of an internal memory is initialized, the state in which the switch 9 is pushed, the operation mode set by the changing switch 10, and the set temperature set by the room-temperature setting device 11 are inputted by a key-scan operation (steps 100 and 102). Next, a time measuring operation is effected in accordance with an operating condition of the compressor 1 (steps 104 through 112). Namely, a timer starts measuring time (step 108) from the time when the compressor 1 is changed from an on state to an off state (i.e., yes in step 104), and the timer continues measuring time during the off state of the compressor 1 (i.e., yes in step 106). Subsequently, if a predetermined time as measured by the timer (for example, two hours) has elapsed (i.e., yes in step 110) and the air conditioner is brought into a stopped state by the switch 9

(i.e., yes in step 111), memory of the cooling mode or the heating mode on the internal memory is invalidated (step 112). Further, if the compressor 1 is actuated once again within two hours, the timer restarts measuring time from the time when the compressor 1 stopped.

Next, the temperature t of the room to be airconditioned and the coil temperature $t_s$ (the temperature of the indoor-side heat exchanger 5) are inputted (steps 113 and 114).

Figure 4:
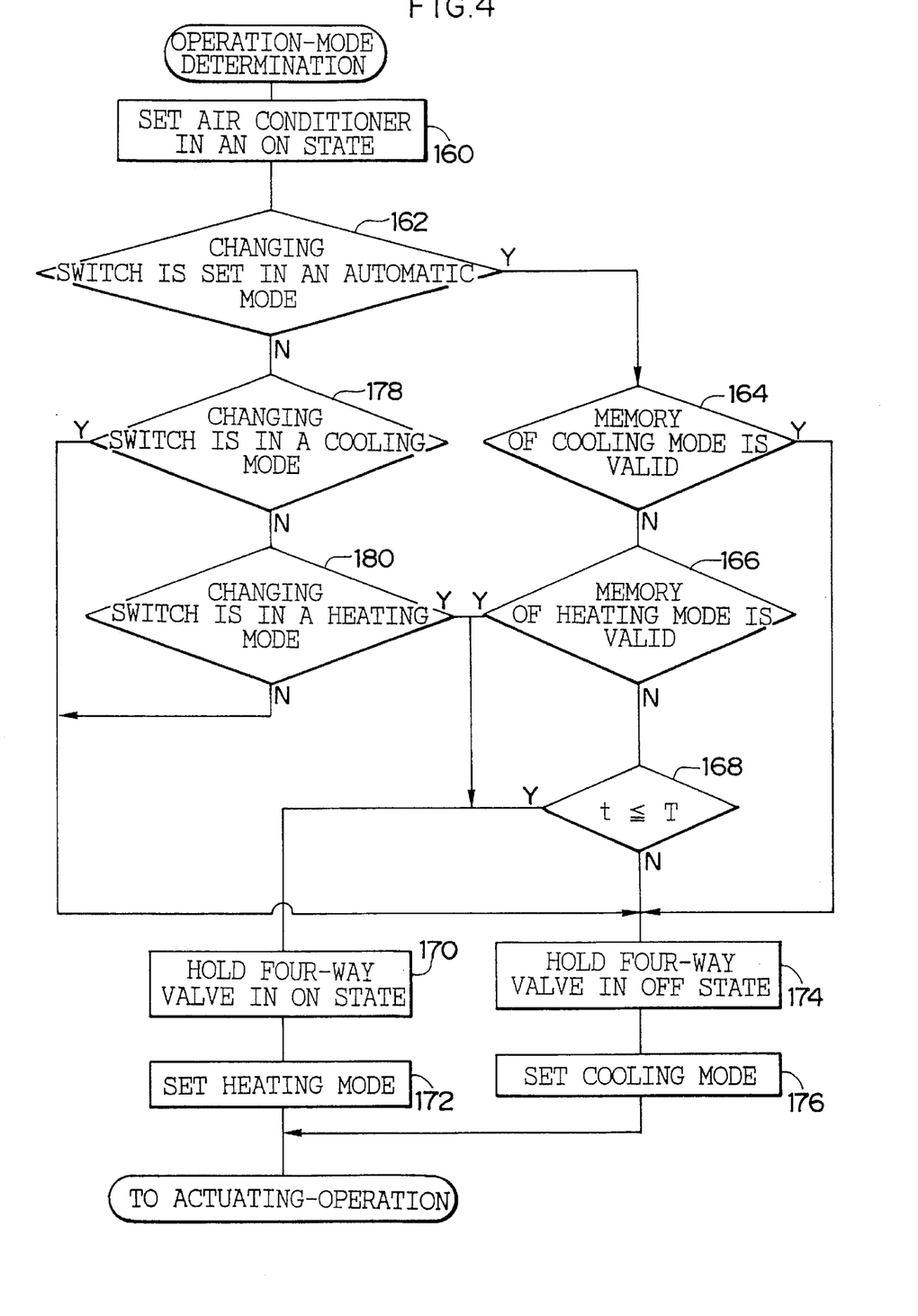
FIG. 4 is a flow chart illustrating details of step 120 in FIG. 1.

When it is determined by the above-described scanning operation that the switch 9 has been pushed, the air conditioner is changed between an operating state and a stopped state (steps 116 through 126). If the air conditioner is changed from the stopped state to the operating state (i.e., no in step 118), the air conditioner is actuated after an operation of "operation-mode determination" (step 120) as shown in FIG. 4 is effected.

The "operation-mode determination" is effected for setting the cooling or heating mode at the beginning of operation of the air conditioner. First, step 160 sets the air conditioner from a stopped state to an on state. Next, it is determined which operation mode the changing switch 10 has been set at (step 162). If the changing switch 10 is set at the automatic mode, it is determined whether or not memory of the cooling or heating mode is valid, and further, if the memory is valid, the air conditioner is actuated in accordance with the mode (steps 164, 166 and 170 through 176). Namely, if the predetermined time has not elapsed in step 110, and therefore, the operation mode has not been invalidated in step 112, the previously-set operation mode is kept. If the memory of mode is not valid, the cooling mode or the heating mode is reset on the basis of a high/low relationship between the temperature T set by the room-temperature setting device 11 and the temperature t of the room to be air-conditioned (steps 168 through 176).

On the other hand, if the changing switch 10 is not set at the automatic mode, the operation mode set by the changing switch 10 is to be set (steps 178, 180, 170 through 176).

After the air conditioner starts operating by an air conditioner-actuating operation (step 124) following this operation-mode determination, or when the air conditioner is under operation and there is no action for the switch 9 (i.e., yes in step 150), the mode set by the changing switch 10 is determined once again, and then the air conditioner is actuated in accordance with the set mode (steps 128 through 148). In the case of the cooling operation in a cooling/blowing mode (i.e., yes in step 128), the room temperature t and the set temperature T are compared with each other during operation, and when the room temperature t becomes the set temperature T, the compressor 1 is turned off to stop the operation thereof. Further, when the room temperature becomes higher than the set temperature by a predetermined temperature, the compressor 1 is turned on to start the operation thereof, so that the room temperature t is controlled to be the set temperature T. Further, also in the case of the heating operation (step 146) in a heating/blowing mode (i.e., yes in step 136), in a manner similar to the cooling operation, the room temperature t is controlled to be the set temperature T by comparing the room temperature t and the set temperature T with each other during operation and effecting on-off control for the compressor.

Meanwhile, when the blowing mode is set during the cooling operation, it is set that t=10, regardless of an actual temperature t in the room to be air-conditioned (steps 130 and 132). t=10 is the minimum value of temperature detection value, and even when a value less than this temperature value is detected, it is also set that t=10. Because the minimum set temperature T of the room-temperature setting device 11 is 18° C., a cooling operation caused by driving of the compressor 1 is not effected, and substantially, a blowing operation is merely effected. Further, during the heating operation, variations in the temperature $t_s$ of the indoor side heat exchanger 5 are detected to effect a defrosting operation or the like.

Figure 5:
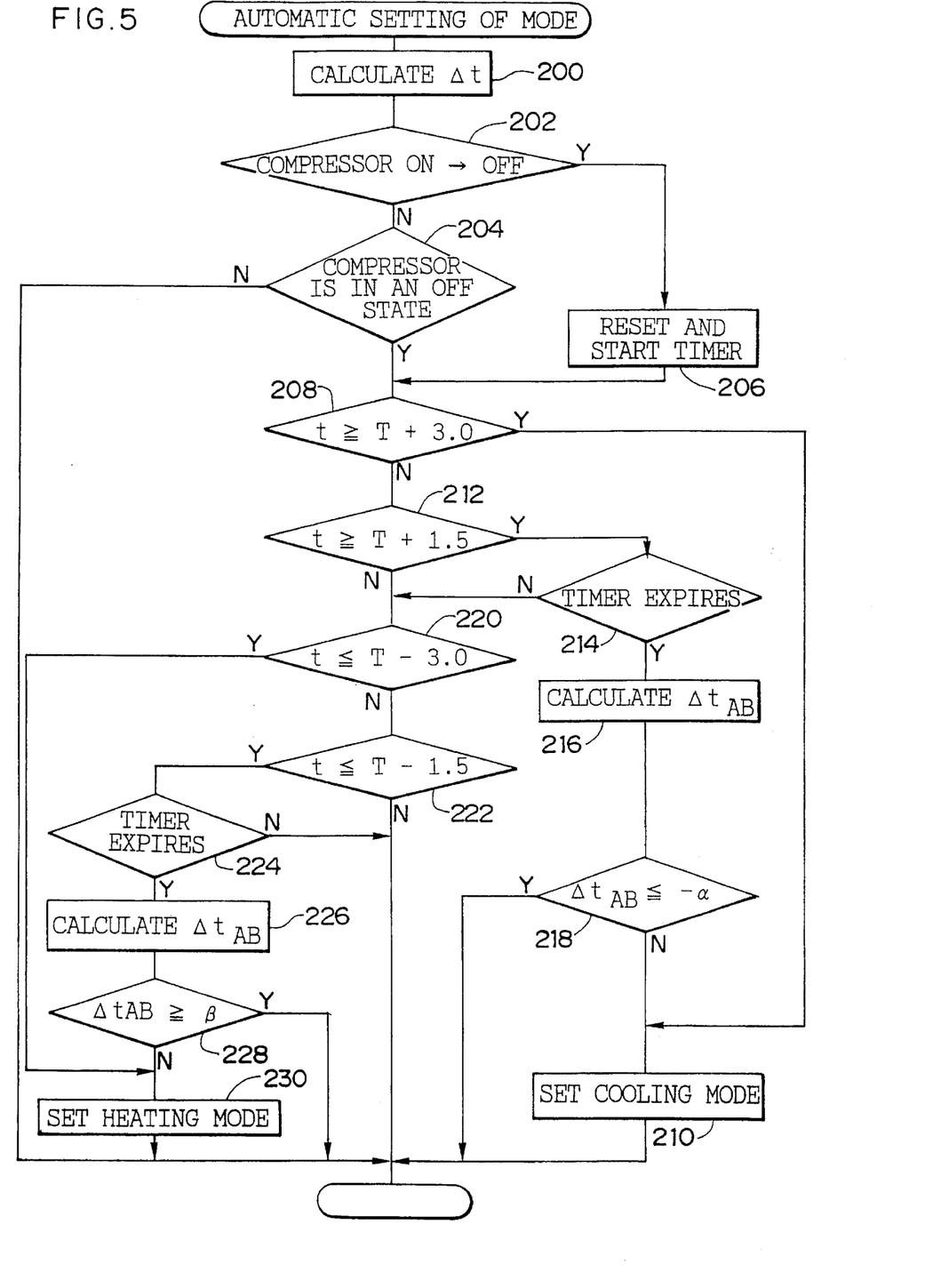
FIG. 5 is a flow chart illustrating details of step 140 in FIG. 1.

Next, a description will be given of details of "automatic setting of modes" of step 140 in the automatic mode (i.e., yes in step 138) to which the present invention is related, with reference to FIG. 5. In the present embodiment, a first region and a second region are defined. The first region is a temperature range which exceeds an upper limit (for example, T+1.5° C.) of an observing region which is a temperature region including a predetermined set temperature T in the center thereof. Within the first region, a third region is defined as a temperature range exceeding a first temperature (for example, T+3.0° C.) which is higher than the upper limit by a predetermined value. The second region is a temperature range which is less than a lower limit (for example, T−1.5° C.) of the observing region. Within the second region, a fourth region is defined as a temperature range less than a second temperature (for example, T−3.0° C.) which is lower than the lower limit by a predetermined value.

First, in step 200, by subtracting a newly-inputted room temperature $t_{NEW}$ from a room temperature $t_{OLD}$ previously inputted in step 113, a rate of change in the room temperature, $\Delta t$ is calculated. In step 204, it is determined whether the compressor 1 has stopped. If the compressor 1 is under operation, the cooling operation or the heating operation is successively effected. When the compressor 1 is brought into a stopped state (off state), a timer starts measuring time (steps 202 and 206). The timer is designed to be reset and start measuring time at the time when the compressor 1 changes from an on state to an off state, and expire at the time when a predetermined time (for example, about an hour) has elapsed.

Next, when the room temperature t is T+3.0° C. or more (i.e., t≧T+3.0), namely, when the room temperature at the present time is in the third region, the cooling mode is directly set irrespective of the current operation mode (steps 208 and 210). As a result, via step 142 in FIG. 3, the cooling operation of step 134 is effected. As described above, the room temperature t and the set temperature T are compared with each other during operation, and when the room temperature t becomes the set temperature T, the compressor is turned off and stops operating. Further, when the room temperature is higher than the set temperature by a predetermined value, the compressor is turned on and starts operating. In this way, the room temperature t is controlled to be the set temperature T.

In a case of T+3.0>t≧T+1.5 (i.e., when the room temperature at the present time is in the first region), and when the timer expires (steps 212 and 214), an average value $\Delta t_{AB}$ of the rate of change in the room temperature, $\Delta t$ is calculated in step 216. In step 218, it is determined whether the average value $\Delta t_{AB}$ is less than a predetermined value −α, thereby determining whether the room temperature has a tendency to fall. When the room temperature has a tendency to fall, it is predicted that the room temperature will become a value within the observing region even if the operation mode is not changed. For this reason, the current operation mode is kept. On the other hand, when the room temperature does not have a tendency to fall, the cooling mode is set (step 210) in such a manner as described above, thereby resulting in the cooling operation of step 134 in FIG. 3 being effected.

Further, in a case of $t \leq T-3.0$, namely, when the room temperature at the present time is in the fourth region, the heating mode is directly set irrespective of the current operation mode (steps 220 and 230). As a result, via step 144 in FIG. 3, the heating operation of step 146 is effected and the room temperature t and the set temperature T are compared with each other during the heating operation. If the room temperature t becomes the set temperature T, the compressor is turned off and stops operating, and if the room temperature becomes lower than the set temperature by a predetermined value, the compressor is turned on and starts operating. In this way, the room temperature t is controlled to be the set temperature T.

In a case of $T-3.0 < t \leq T-1.5$ (i.e., when the room temperature at the present time is in the second region), and when the timer expires (steps 222 and 224), the average value $\Delta t_{AB}$ of the rate of change in the room temperature, $\Delta t$, is calculated in step 226. In step 228, it is determined whether or not the average value $\Delta t_{AB}$ is greater than/equal to a predetermined set value $\beta$, thereby determining whether the room temperature has a tendency to rise. When the room temperature has a tendency to rise, it is predicted that the room temperature becomes a value within the observing region even if the operation mode is not changed. For this reason, the current operation mode is kept. On the other hand, when the room temperature does not have a tendency to rise, the heating mode is set (step 230) in such a manner as described above, thereby resulting in the heating operation of step 146 in FIG. 3 being effected.

In the foregoing, the case in which the measuring of time by the timer is started from the time when the compressor 1 is changed from an on state to an off state, was described. Alternatively, the timer may start measuring time from the time when the temperature t becomes a value within a temperature range of $t \geq T+1.5$ or becomes a value within a temperature range of $t \leq T-1.5$ in a state in which the compressor is turned off, whereby the changing of the operation mode can be performed by measuring, as the first time, the period of time in which the room temperature resides within the first region which exceeds the upper limit of the observing region including the predetermined set temperature, and by measuring, as the second time, the period of time in which the room temperature resides within the second region which is less than the lower limit of the observing region. Also in this case, the same effects as described above can be obtained.

Figure 6:
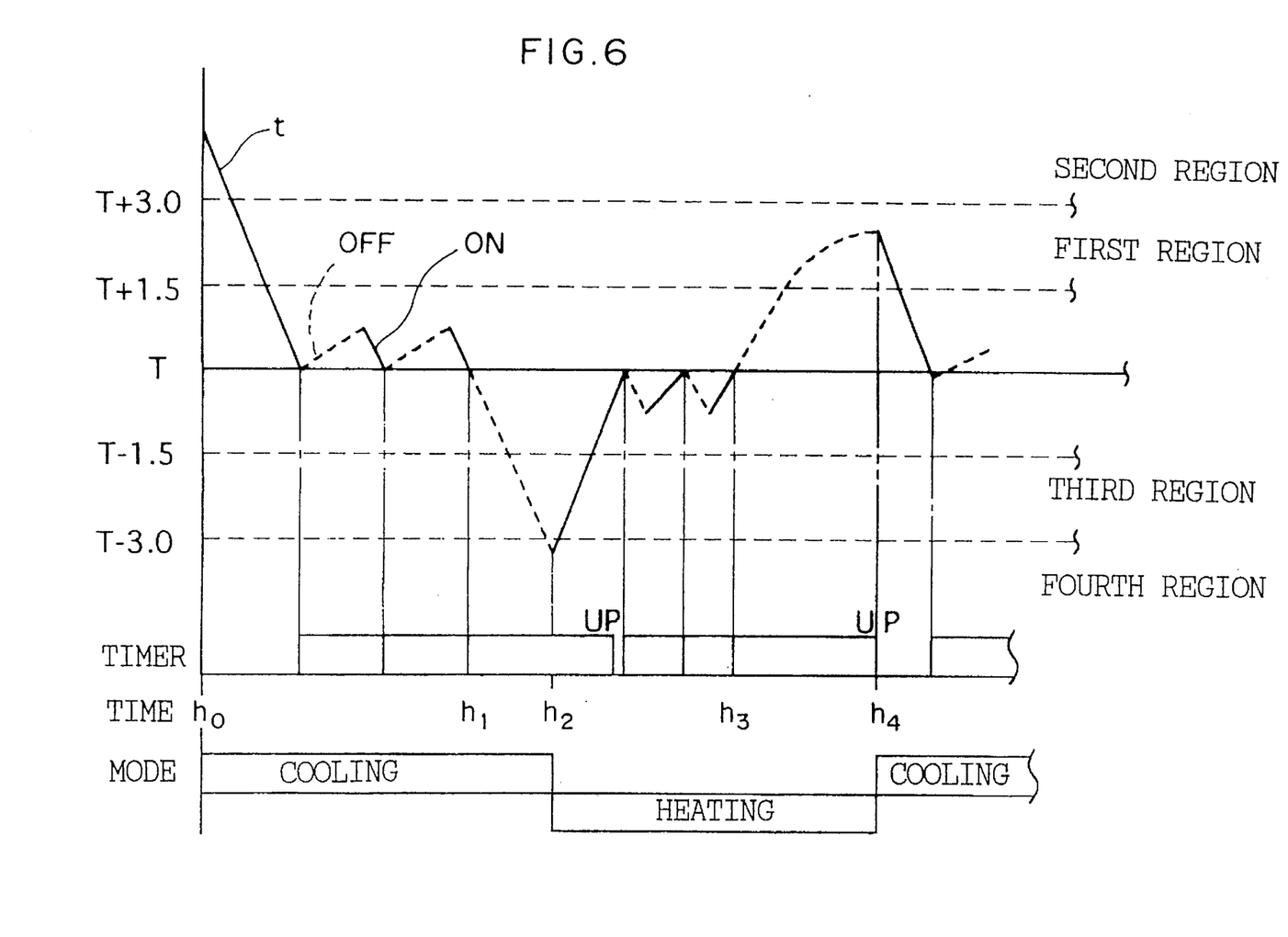
FIG. 6 is an explanatory diagram illustrating a cooling/heating changing operation caused by the controller shown in FIG. 1.

A description will be given, with reference to FIG. 6, of a manner in which the operation mode changes between the cooling mode and the heating mode when the changing switch 10 is set at the automatic mode in the air conditioner structured as above. It should be noted that, in a graph which illustrates variations in the room temperature t in FIG. 6, a solid-line portion and a broken-line portion illustrate an on state and an off state of the compressor, respectively.

When the air conditioner starts operating by pushing the switch 9 at the time of $h_0$, the temperature t at this time is higher than the set temperature T. As a result, a cooling operation is effected. Between the time $h_0$ and the time $h_1$, the temperature t of the room to be air-conditioned and the set temperature T are compared with each other to effect a thermo-cycle operation wherein the compressor is controlled to be on or off. Decreasing of outside air temperature, or the like, occurs from the time $h_f$. When the temperature t becomes a value within a temperature range of $t \leq T-3.0$ at the time $h_2$ after a short period of time has passed from the time $h_1$, the operation mode is directly changed from the cooling mode to the heating mode and the heating operation starts. Subsequently, a thermo-cycle operation for heating is effected up to the time $h_3$ in a manner similar to the cooling operation. The outside air temperature rises again from the time when the compressor is turned off at the time $h_3$, and the temperature t of the room to be air-conditioned is stabilized while satisfying a condition "$t \geq T+1.5$". When the timer expires at the time $h_4$ in this state, the operation mode is changed from the heating mode to the cooling mode and the cooling operation starts again. It should be noted that, if the room temperature has a tendency to fall, the operation mode is not changed and the room temperature naturally decreases to be any value within the observing region.

Thus, when the temperature t of the room to be air-conditioned is kept in a state of $3.0 \geq |t-T| \geq 1.5$ even after the predetermined time and when the room temperature is not changing toward the observing region, or when the temperature t satisfies the condition $|t-T| \geq 3.0$, the operation mode is to be changed. For this reason, a masking operation of the timer functions when the temperature temporarily changes, so as to prevent the operation mode from being incorrectly changed. Further, when the temperature changes largely, the operation mode is changed irrespective of the masking operation of the timer.

Further, when the room temperature in the temperature range of $T+1.5 \leq t \leq T+3.0$ has a tendency to fall, and when the room temperature in the temperature range of $T-3.0 \leq t \leq T-1.5$ has a tendency to rise, the operation mode is kept as it is. This makes it possible to prevent the operation mode from being incorrectly changed when the room temperature is changing toward the observing region.

Further, the cooling or heating mode is kept over the fixed period of time from the time when the compressor 1 stops. When the operation starts again after the air conditioner or the compressor once stops operating by operating the switch 9 or the changing switch 10, the previously-set operation mode is used.

Moreover, in this embodiment, the temperature range between the set temperature and the upper limit of the observing region and the temperature range between the set temperature and the lower limit thereof are equal to each other, i.e., 1.5° C., and the first predetermined time and the second predetermined time are equal to each other, i.e., about an hour. For this reason, a program of the microcomputer is simplified, and therefore, other control programs can be increased. As a result, controllability of the entire air conditioner improves.

Meanwhile, in the foregoing, the example was described in which it is predicted from the average value of the rate of change in the room temperature that the room temperature has a tendency to rise or fall. However, it may be predicted that the room temperature has a tendency to rise or fall on the basis of the rate of change in the room temperature, the rate of change in the room-temperature average values, or a predicted value obtained by adding the rate of change to the present-time room temperature.

As described above, the present invention has an excellent effect in that, since the operation mode is not changed in a state in which the room temperature is predicted to become a value within the observing region, air-conditioning can be controlled so that the users feel comfortable.

While the embodiments of the present invention, as herein disclosed, constitute a preferred form, it is to be understood that other forms might be adopted.

What is claimed is:

1. A controller for an air conditioner having a detecting means for detecting temperature of a room to be airconditioned, said room being heated or cooled so that said temperature becomes a desired temperature, comprising:

predicting means for predicting a temperature tendency of said room;

time measuring means for measuring a first period of time and a second period of time;

control means for controlling a heating mode for heating said room and a cooling mode for cooling said room such that said temperature becomes said desired temperature;

first changing means which, in a case where, in said heating mode, said room temperature is within a first region which exceeds an upper limit of an observing region including said desired temperature when said first period of time has elapsed, changes said heating mode to said cooling mode if said temperature tendency is rising; and second changing means which, in a case where, in said cooling mode, said room temperature is within a second region which is less than a lower limit of said observing region including said desired temperature when said second period of time has elapsed, changes said cooling mode to said heating mode if said temperature tendency is falling.

2. A controller for an air conditioner, according to claim 1, wherein said temperature tendency of said room to be airconditioned is predicted on the basis of a rate of change in said detected temperature of said room.

3. A controller for an air conditioner, according to claim 1, wherein said temperature tendency of said room to be airconditioned is predicted on the basis of a rate of change of a temperature average value of said room.

4. A controller for an air conditioner, according to claim 1, wherein said temperature tendency of said room to be airconditioned is predicted..on the basis of an average value of the rate of change in said detected temperature of said room.

5. A controller for an air conditioner, according to claim 1, wherein said temperature tendency of said room to be airconditioned is predicted on the basis of a predicted value obtained by adding the rate of change in the room temperature to a current room temperature.

6. A controller for an air conditioner, according to claim 1, wherein said desired temperature is set at the center of said observing region.

7. A controller for an air conditioner, according to claim 1, further comprising maintaining means which in a case where, in said heating mode, said room temperature is within said first region when said first period of time has elapsed, maintains said heating mode if said temperature tendency is falling, in a case where, in said cooling mode, said room temperature is within said second region when said second period of time has elapsed, maintains said cooling mode if said temperature tendency is rising, and in a case where said room temperature is within said observing region, maintains, the current cooling or heating mode as it is.

8. A controller for an air conditioner having a detecting means for detecting temperature of a room to be airconditioned, said room being heated or cooled so that said temperature becomes a desired temperature, comprising:

predicting means for predicting a temperature tendency of said room;

time measuring means for measuring, as a first period of time, an elapsed time after heating of said room is stopped, and measuring, as a second period of time, an elapsed time after cooling of said room is stopped;

control means for controlling a heating mode for heating said room and a cooling mode for cooling said room such that said temperature becomes said desired temperature;

first changing means which, in a case where, in said heating mode, said room temperature is within a first region which exceeds an upper limit of an observing region including said desired temperature when said first period of time has elapsed, changes said heating mode to said cooling mode if said temperature tendency is rising; and second changing means which, in a case where, in said cooling mode, said room temperature is within a second region which is less than a lower limit of said observing region including said desired temperature when said second period of time has elapsed, changes said cooling mode to said heating mode if said temperature tendency is falling.

9. A controller for an air conditioner, according to claim 8, wherein said temperature tendency of said room to be airconditioned is predicted on the basis of a rate of change in said detected temperature of said room.

10. A controller for an air conditioner, according to claim 8, wherein said temperature tendency of said room to be airconditioned is predicted on the basis of a rate of change of a temperature average value of said room.

11. A controller for an air conditioner, according to claim 8, wherein said temperature tendency of said room to be airconditioned is predicted on the basis of an average value of the rate of change in said detected temperature of said room.

12. A controller for an air conditioner, according to claim 8, wherein said temperature tendency of said room to be airconditioned is predicted on the basis of a predicted value obtained by adding the rate of change in the room temperature to a current room temperature.

13. A controller for an air conditioner, according to claim 8, wherein said desired temperature is set at the center of said observing region.

14. A controller for an air conditioner, according to claim 8, wherein said first period of time and said second period of time are equal to each other.

15. A controller for an air conditioner, according to claim 8, further comprising maintaining means which in a case where, in said heating mode, said room temperature is within said first region when said first period of time has elapsed, maintains said heating mode if said temperature tendency is falling, in a case where, in said cooling mode, said room temperature is within said second region when said second period of time has elapsed, maintains said cooling mode if said temperature tendency is rising, and in a case where said room temperature is within said observing region, maintains the current cooling or heating mode as it is.

16. A controller for an air conditioner having a detecting means for detecting temperature of a room to be airconditioned, said room being heated or cooled so that said temperature becomes a desired temperature, comprising:

predicting means for predicting a temperature tendency of said room;

time measuring means for measuring, as a first period of time, an elapsed time after heating of said room is stopped and said room temperature has become a value within a first region which exceeds an upper limit of an observing region including said desired temperature, and measuring, as a second period of time, an elapsed time after cooling of said room is stopped and said room temperature has become a value within a second region which is less than a lower limit of said observing region;

control means for controlling a heating mode for heating said room and a cooling mode for cooling said room such that said temperature becomes said desired temperature;

first changing means which, in a case where, in said heating mode, said room temperature is within said first region which exceeds said upper limit of said observing region including said desired temperature when said first period of time has elapsed, changes said heating mode to said cooling mode if said temperature tendency is rising; and second changing means which, in a case where, in said cooling mode, said room temperature is within said second region which is less than said lower limit of said observing region including said desired temperature when said second period of time has elapsed, changes said cooling mode to said heating mode if said temperature tendency is falling.

17. A controller for an air conditioner, according to claim 16, further comprising maintaining means which in a case where, in said heating mode, said room temperature is within said first region when said first period of time has elapsed, maintains said heating mode if said temperature tendency is falling, in a case where, in said cooling mode, said room temperature is within said second region when said second period of time has elapsed, maintains said cooling mode if said temperature tendency is rising, and in a case where said room temperature is within said observing region, maintains the current cooling or heating mode as it is.

18. A method for controlling an air conditioner to heat or cool a room so that the temperature of said room remains at the desired temperature, said air conditioner having a detecting means for detecting the temperature of said room, a heating mode for heating said room and a cooling mode for cooling said room, said method comprising the steps of:

(a) predicting a temperature tendency of said room based on a change in temperature detected by said detecting means;

(b) controlling said heating mode and said cooling mode based on said temperature tendency by a protocol comprising:

(i) measuring a first period of time and a second period of time;

(ii) changing said heating mode to said cooling mode if said temperature tendency is rising in the case that said detected temperature is within a first region which exceeds an upper limit of an observing region including said desired temperature when said first period of time has elapsed; and (iii) changing said cooling mode to said heating mode if said temperature tendency is falling in the case that said detected temperature is within a second region which is less than a lower limit of said observing region including said desired temperature when said second period of time has elapsed, whereby said detected temperature becomes said desired temperature.

19. The method for controlling an air conditioner according to claim 18, wherein, in step (a), said temperature tendency of said room is predicted based on a rate of change in detected temperature of said room.

20. The method for controlling an air conditioner according to claim 18, wherein, in step (a), said temperature tendency of said room is predicted based on a rate of change in a temperature average value calculated from detected temperature of said room.

21. The method for controlling an air conditioner according to claim 18, wherein, in step (a), said temperature tendency of said room is predicted based on an average value of the rate of change in detected temperature of said room.

22. The method for controlling an air conditioner according to claim 18, wherein, in step (a), said temperature tendency of said room is predicted based on a predicted value obtained by adding the rate of change in detected temperature of said room to a current room temperature.

23. The method for controlling an air conditioner according to claim 18, wherein said desired temperature is set at the center of said observing region.

24. The method for controlling an air conditioner according to claim 18, step (b) further comprising:

(iv) maintaining said heating mode if said temperature tendency is falling in the case that said detected temperature is within said first region when said first period of time has elapsed;

(v) maintaining said cooling mode if said temperature tendency is rising in the case that said detected temperature is within said second region when said second period of time has elapsed; and (vi) maintaining the current cooling or heating mode as is, in the case that said detected temperature is within said observing region.

25. A method for controlling an air conditioner to heat or cool a room so that the temperature of said room remains at the desired temperature, said air conditioner having a detecting means for detecting the temperature of said room, a heating mode for heating said room and a cooling mode for cooling said room, said method comprising the steps of:

(a) predicting a temperature tendency of said room based on a change in temperature detected by said detecting means;

(b) controlling said heating mode and said cooling mode based on said temperature tendency by a protocol comprising:

(i) measuring an elapsed time of a first period when heating of said room is stopped, and an elapsed time of a second period when cooling of said room is stopped;

(ii) changing said heating mode to said cooling mode if said temperature tendency is rising in the case that said detected temperature is within a first region which exceeds an upper limit of an observing region including said desired temperature when said first period has elapsed; and (iii) changing said cooling mode to said heating mode if said temperature tendency is falling in the case that said detected temperature is within a second region which is less than a lower limit of said observing region including said desired temperature when said second period has elapsed, whereby said detected temperature becomes said desired temperature.

26. The method for controlling an air conditioner according to claim 25, wherein, in step (a), said temperature tendency of said room is predicted based on a rate of change in detected temperature of said room.

27. The method for controlling an air conditioner according to claim 25, wherein, in step (a), said temperature tendency of said room is predicted based on a rate of change in a temperature average value calculated from detected temperature of said room.

28. The method for controlling an air conditioner according to claim 25, wherein, in step (a), said temperature tendency of said room is predicted based on an average value of the rate of change in detected temperature of said room.

29. The method for controlling an air conditioner according to claim 25, wherein, in step (a), said temperature tendency of said room is predicted based on a predicted value obtained by adding the rate of change in detected temperature of said room to a current room temperature.

30. The method for controlling an air conditioner according to claim 25, wherein said desired temperature is set at the center of said observing region.

31. The method for controlling an air conditioner according to claim 25, wherein, in step (b)(i), the duration of said first period and that of said second period are equal.

32. The method for controlling an air conditioner according to claim 25, step (b) further comprising:
   (iv) maintaining said heating mode if said temperature tendency is falling in the case that said detected temperature is within said first region when said first period of time has elapsed;
   (v) maintaining said cooling mode if said temperature tendency is rising in the case that said detected temperature is within said second region when said second period of time has elapsed; and
   (vi) maintaining the current cooling or heating mode as is in the case that said detected temperature is within said observing region.

33. A method for controlling an air conditioner to heat or cool a room so that the temperature of said room remains at the desired temperature, said air conditioner having a detecting means for detecting the temperature of said room, a heating mode for heating said room and a cooling mode for cooling said room, said method comprising the steps of:

(a) predicting a temperature tendency of said room based on a change in temperature detected by said detecting means;

(b) controlling said heating mode and said cooling mode based on said temperature tendency by a protocol comprising:
   (i) measuring an elapsed time of a first period when heating of said room is stopped at a temperature within a first region which exceeds an upper limit of an observing region including said desired temperature;
   (ii) measuring an elapsed time of a second period when cooling of said room is stopped at a temperature within a second region which is less than a lower limit of said observing region;
   (iii) changing said heating mode to said cooling mode if said temperature tendency is rising in the case that said detected temperature is within said first region when said first period has elapsed; and
   (iv) changing said cooling mode to said heating mode if said temperature tendency is falling in the case that said detected temperature is within said second region when said second period has elapsed, whereby said detected temperature becomes said desired temperature.

34. The method for controlling an air conditioner according to claim 33, step (b) further comprising:
   (v) maintaining said heating mode if said temperature tendency is falling in the case that said detected temperature is within said first region when said first period of time has elapsed;
   (vi) maintaining said cooling mode if said temperature tendency is rising in the case that said detected temperature is within said second region when said second period of time has elapsed; and
   (vii) maintaining the current cooling or heating mode as is, in the case that said detected temperature is within said observing region.

* * * * *